United States Patent [19]

Sanders

[11] Patent Number: 5,342,250

[45] Date of Patent: Aug. 30, 1994

[54] PROCESS FOR THE MANUFACTURE OF AN ENDLESS TRANSFER BELT

[76] Inventor: Ronald W. Sanders, 9803 Creekfront Rd., #806, Jacksonville, Fla. 32256

[21] Appl. No.: 114,487

[22] Filed: Aug. 31, 1993

[51] Int. Cl.⁵ .......................... F16G 3/10; F16G 3/16
[52] U.S. Cl. .................................. 474/249; 474/254; 474/260; 156/137
[58] Field of Search ............... 474/249, 237, 253, 254, 474/260, 268; 198/834, 844.2; 156/137

[56] References Cited

U.S. PATENT DOCUMENTS

| | | | |
|---|---|---|---|
| 66,261 | 7/1867 | Smith | 474/254 X |
| 2,547,220 | 4/1951 | Merrill | 474/254 X |
| 3,186,248 | 6/1965 | Burrell | 474/254 |
| 3,231,065 | 1/1966 | Kaminski et al. | |
| 3,642,120 | 2/1972 | Duhan | 474/135 X |
| 3,812,953 | 5/1974 | Maschke | |
| 4,235,120 | 11/1980 | Candle | 474/254 |
| 4,289,231 | 9/1981 | Kaminski | 474/900 X |
| 4,862,757 | 9/1989 | Dahl | 474/255 X |

*Primary Examiner*—Roger J. Schoeppel
*Attorney, Agent, or Firm*—Thomas C. Saitta

[57] ABSTRACT

A process is disclosed for the manufacture of endless looped transfer belts having extremely low loss of registration over the length of the belt. The process comprises steps for creating the apertures in the belt with little center to center deviation, creating a splice joint for forming the endless loop, and joining the ends of the belt, utilizing apparatus specifically designed to provide indexing posts, registration posts and dimensioning plugs to insure accuracy in the finished belt.

9 Claims, 3 Drawing Sheets

PROCESS FOR THE MANUFACTURE OF AN ENDLESS TRANSFER BELT

BACKGROUND OF THE INVENTION

This invention relates generally to the field of the manufacture of endless looped transfer or conveyor belts having a repetitive pattern of transfer apertures. More particularly, this invention relates to a process for manufacturing such a belt, including the steps of creating the apertures, cutting the belt to form a splice joint, and joining the belt to create an endless looped belt, whereby loss of registration is kept to a minimum.

Endless transfer belts are well-known. The belts are used to pick up components in a manufacturing process and move them to another location for further manufacturing steps. A common example is in the making of cans. The lids are stamped out, picked up by the apertures in the transfer belt and moved to successive locations where forming operations are carried out and the lids are eventually attached to the cans. Typical transfer belts can be twenty, thirty or more feet in length, and move at speeds faster than the eye can register. A major problem in these operations is the down time which results when a transfer belt gets out of register or loses some of the objects it is carrying.

While OEM belts can be manufactured to very good tolerances, replacement belts suffer from a lack of registration. To create replacement belts, it is current practice to create the repetitive aperture pattern by eyeball alignment—that is, a set of apertures is punched, then the belt is advanced to a mark and the next set of apertures is punched. Splice joints are cut and the two free ends are spliced using metal splices or glues. The registration is usually difficult to maintain using these methods, and loss of registration of up to ¾ inches per 20 feet are common. Additionally, the metal splices can loosen and damage the expensive machinery and the glue joints eventually break. With tens of thousands of transfers occurring per hour, time lost to necessary replacement or re-registration of belts is costly.

A novel and unique process for creating apertured endless looped transfer belts with minimal loss of registration has been invented. The process comprises the steps of creating the apertures in the belt material, creating the splice joint and joining the belt ends to each other using melt flow under pressure. The resulting belts have extremely low loss of registration—less that ¼ inches typically for a twenty foot belt. The splice joint is strong and flexible, such that it will not separate over time. The apertures likewise are extremely accurate in dimensions and relative location, even at the splice joint.

SUMMARY OF THE INVENTION

The invention is a process, and the product made by the process, for manufacturing an endless conveyor or transfer belt having plural apertures of matching dimension and exact registration as to center to center distances throughout the length of the belt, both during aperture formation and after splicing to create the endless loop. The process comprises the steps of providing an aperture punching apparatus, a splice cutting apparatus and a belt joining apparatus, each having indexing posts for proper alignment and registration of the belt during each manufacturing procedure, as well as the steps of punching the apertures in the belt, creating the splice joint, and joining the belt ends to form an endless belt.

The belt is manufactured beginning with non-apertured stock material. The aperture punching apparatus comprises a multi-cavity die containing the cutting blades and two or more indexing posts for correct positioning of the belt during successive punching operations. The indexing posts correspond in exact dimension and spacing relative to the apertures created by the cutting blades. After each punching operation, the belt is advanced such that the last apertures are positioned onto the indexing posts to insure the correct registration of the next set of apertures. The splice cutting apparatus comprises a central cutting area bounded on each side by at least two registration posts, again corresponding in exact dimension and spacing to the apertures in the belt, but of a height at least twice the thickness of the belt. One belt end is mounted onto the registration posts on one side of the cutting area such that the belt extends across the cutting area to the opposite registration posts. The other belt end is then mounted onto the registration posts from the opposite side such that it overlaps the other end of the belt and the cutting area. The registration posts maintain proper alignment and registration of the two ends such that finger or zig-zag joints can be cut into both belt ends at the same time. The belt joining apparatus comprises a hot press with an uninterrupted series of dimensioning plugs matching the dimensions and spacing of the apertures, such that the two ends are positioned on the dimensioning plugs to mate the finger or zig-zag splice cuts. The registration plugs insure proper dimensioning and registration of the apertures during the hot press joining step. Upon completion, the process creates an endless loop transfer belt having apertures with minimal deviation in spacing and dimension over the length of the belt.

DETAILED DESCRIPTION OF THE INVENTION

With references to the drawings, the invention is now described in detail. An endless loop transfer belt is created from a length of stock material by creating apertures and a splice joint in the belt material and joining two ends of the belt to each other. The process creates a belt with minimal deviation in aperture dimensions and aperture to aperture distances and alignment. The process comprises the steps of providing an aperture punching apparatus, a splice cutting apparatus and a belt joining apparatus, cutting apertures into the belt, creating a splice joint and joining the ends of the belt to create an endless loop. The process is applicable to belts having one, two or any number of longitudinal rows of apertures. For purposes of this disclosure, the invention is described and illustrated using pairs of apertures.

Figure 1:
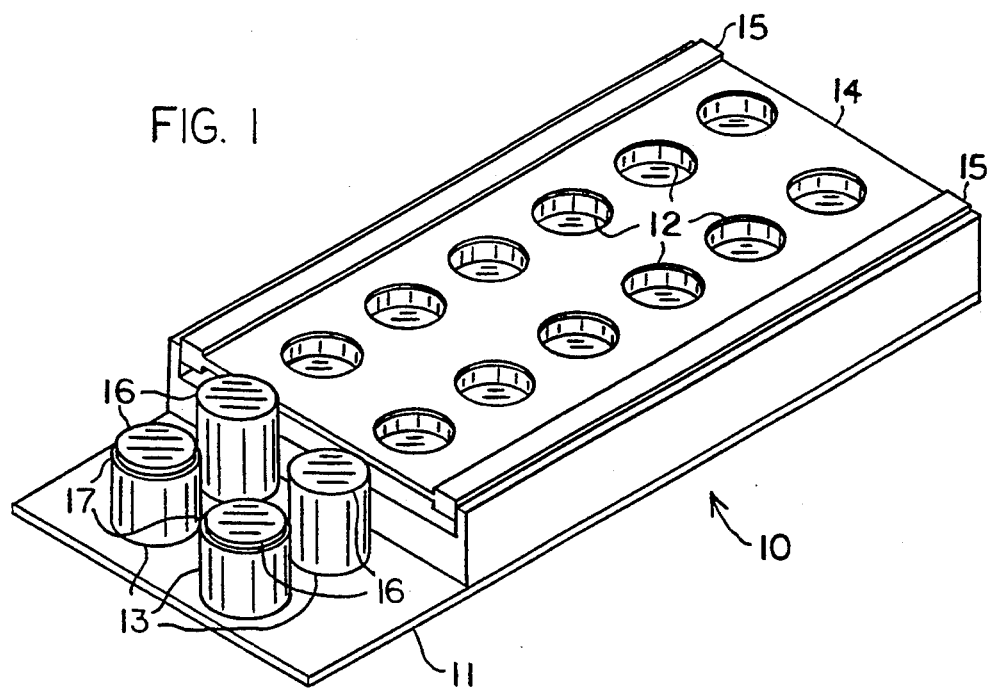
FIG. 1 is a perspective view of the aperture punching apparatus.
Figure 2:
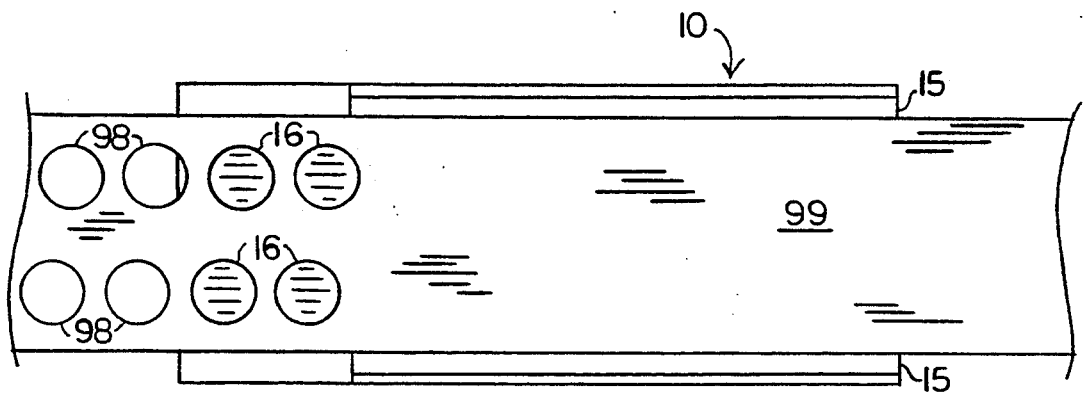
FIG. 2 is a top view of the aperture punching apparatus with a belt positioned on the indexing posts.
Figure 3:
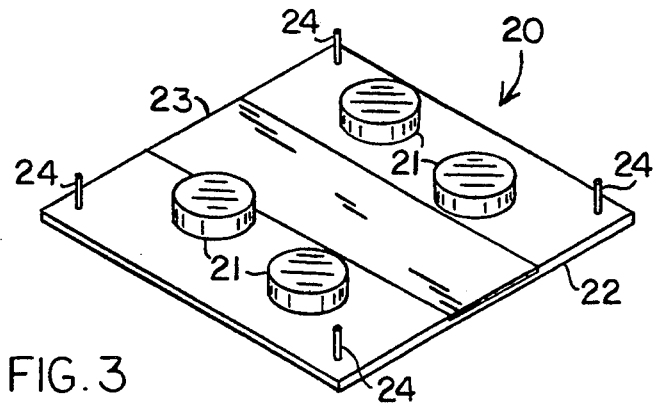
FIG. 3 is a perspective view of the splice cutting apparatus.

Referring now to FIGS. 1 and 2, the aperture punching apparatus is shown. This component is part of standard type punch press in which force is applied to drive a number of cutting dies or blades through a material to create apertures in the material. As shown in FIG. 1, the aperture punching apparatus 10 comprises a rectangular die-plate 11 to which are mounted a number of cutting blades 12 and indexing posts 13. An apertured spring plate 14 is mounted above the die plate 11 and surrounds the cutting blades 12, its upper surface being positioned even with the upper surface of the cutting blades 12 to provide a horizontal surface to hold the belt 99 during the punching step. Linear edge members 15 extend along each lateral side of the spring plate 14, separated at a distance to correspond to the width of the belt 99 being cut. Preferably, one such edge member 15 is spring tensioned to force the belt 99 against the other edge member 15 for better alignment. The cutting blades 12, typically circular as shown, are all of equal diameter. The center to center spacing of each cutting blade 12 is likewise equal in longitudinal and latitudinal directions to corresponding center to center spacing of the repetitive pattern, respectively, at tolerances of less than two thousandths of an inch.

Indexing posts 13 are mounted onto the die plate 11 adjacent the spring plate 14. At least two and preferably four indexing posts 13 are utilized. The indexing posts 13 comprise an aperture mating member 16 corresponding in exact configuration and dimension to the cutting blades 12, with the height of the mating member 16 equal to or greater than the thickness of the belt 99. The lower portion of each indexing post 13 is preferably of greater diameter than the mating member 16 to form a shoulder 17 to receive the belt 99. The repetitious pattern of the cutting dies 12 is continued with the positioning of the indexing posts 13, such that the center to center distances of the indexing posts 13 is identical to the center to center distances of the cutting blades 12.

The aperture cutting apparatus 10 is placed into a cutting press, not shown. The free end of a stock roll of transfer belt material 99 is placed onto the spring plate 14, its edges aligned and held in position by the edge members 15. The press is activated, which forces down belt 99 and spring plate 14 such that the cutting blades 12 punch apertures 98 through the material. The press is released, the spring plate 14 raises the belt 99 off the cutting blades 12 and the plugs are removed from the apertures 98.

To continue the process the belt 99 is now shifted downward to punch the next series of apertures 98. To insure correct dimensioning, the back apertures 98 are pressed onto the mating members 16 of indexing posts 13, as seen in FIG. 2. Since the mating members 16 are identical in dimension and spacing to the cutting blades 12 and are positioned to continue the pattern of the cutting blades 12, the center to center longitudinal distance between the back apertures 98 cut in the first punch and the front apertures 98 to be cut in the second punch will be identical to the center to center distances between the apertures 98 of each group. The press is again activated and the second set of apertures 98 is cut into belt 99. This series of steps is then repeated until the desired length of belt 99 has been apertured. Since each successive group of apertures 98 is precisely positioned by the indexing posts 13, there will be no deviation no matter how long the required belt 99.

The transfer belt 99 now contains a number of apertures 98, a first end 97 and a second end 96. To create an endless loop transfer belt, it is necessary to join the two ends. A splice cutting apparatus 20, shown in FIGS. 3 through 7, is provided which comprises at least two, but preferably four, registration posts 21 having a height at least twice the thickness of belt 99 (belts typically ranging in thickness from 100 to 200 thousandths inches) mounted onto a base member 22. The registration posts 21 are positioned to either side of a cutting surface 23. The cutting surface 23 is preferably formed of a hard polymer material, such as nylon or polypropylene. The registration posts 21 to each side of the cutting surface 23 correspond to the outer sets of apertures 98 in a series of three successive aperture sets. That is, the center to center longitudinal separation of the corresponding registration posts 21 is equal to twice the center to center longitudinal distance between apertures 98. As with the mating members 16 of indexing posts 13, the registration posts 21 have dimensions and positioning matching the dimensions and positioning of apertures 98.

Figure 4:
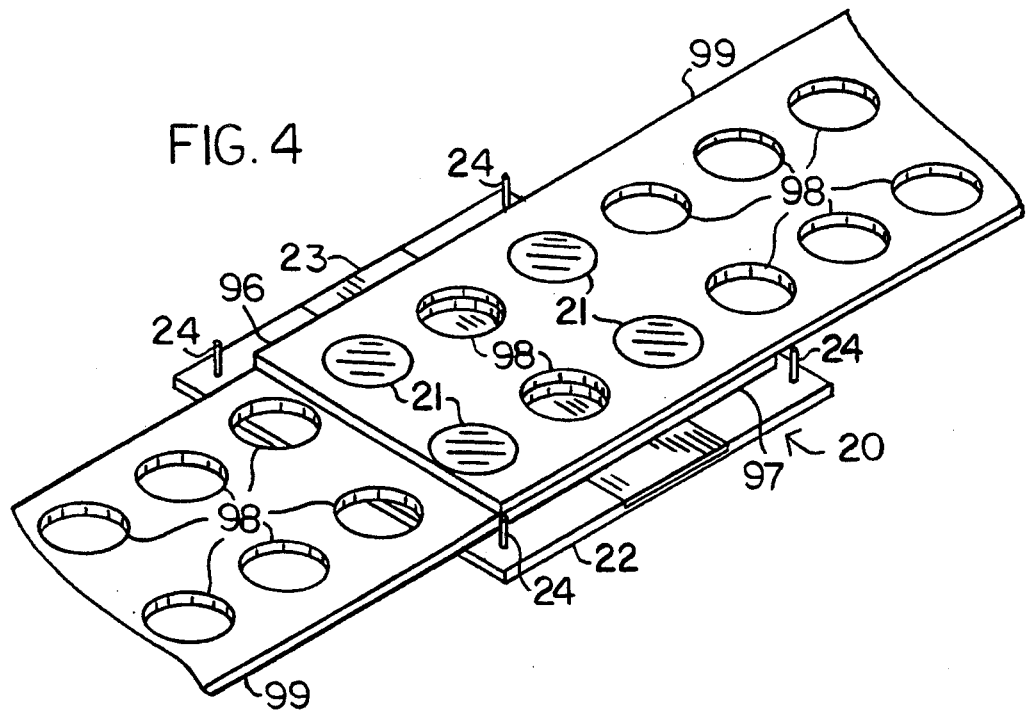
FIG. 4 is a perspective view of the splice cutting apparatus showing the two ends of the belt in position for cutting.
Figure 5:
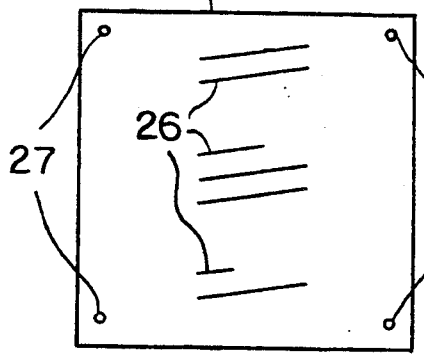
FIGS. 5 is a bottom view of one of the pair of splice cutters.
Figure 6:
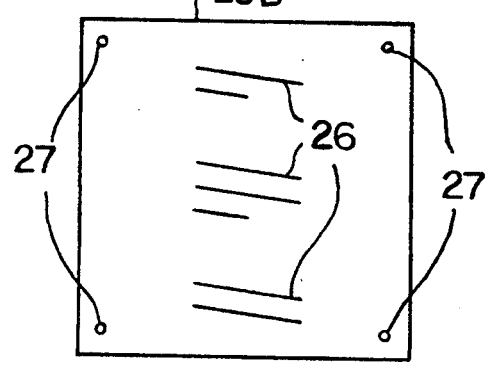
FIG. 6 is a bottom view of the other splice cutter.
Figure 7:
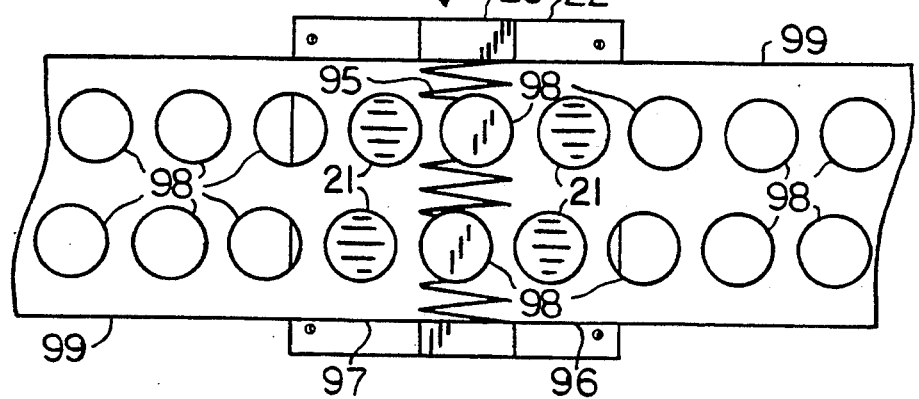
FIG. 7 is a top view of the belt and splice cutting apparatus showing the completed splice cut.

To create the splice cut 95, the outermost apertures 98 of first end 97 of belt 99 are mounted onto one set of registration posts 21, such that the second to outermost apertures 98 extend across the cutting surface 23 and the third to outermost apertures 98 mount onto the opposite set of registration posts 21, as seen in FIG. 4. The second end 95 of belt 99 is then placed onto the cutting apparatus 20 overlapping the first end 97 in the opposite direction, such that the outermost apertures 98 are mounted onto one set of registration posts 21, the second to outermost apertures 98 extend across the cutting surface 23 and the third to outermost apertures 98 mount onto the remaining registration posts 21. The outermost apertures 98 of first end 97 align with the third to outermost apertures 98 of second end 96, and vice versa. A finger or zig-zag joint is preferable for mating the two ends of belt 99. To cut this pattern, a pair of cutting plates 25a and 25b, shown respectively in FIGS. 5 and 6, are required. Each cutting plate 25 has a series of blades 26, the blades on cutting plate 25a being of opposite slant to the blades of cutting plate 25b. Cutting plates 25 have positioning apertures 27 which correspond to blade positioning members 24 on base member 22 to properly align the blades 26 during the cutting operation. To create the splice cut 95, cutting plate 25a is pressed down onto the overlapping belt ends 97 and 96 after aligning the positioning apertures 27 with the positioning members 24. This identically cuts both layers of the belt 99 in one direction. Cutting plate 25a is removed and cutting plate 25b is positioned and pressed down onto the overlapping belt ends 97 and 96. This cuts the belt 99 in the other direction, and because the alignment of each cutting plate 25 is controlled, the zig-zag or finger splice cut 95 results. Upon removal of the excess pieces of belt 99, the splice cut 95 allows the two ends 97 and 96 to mate exactly.

Figure 8:
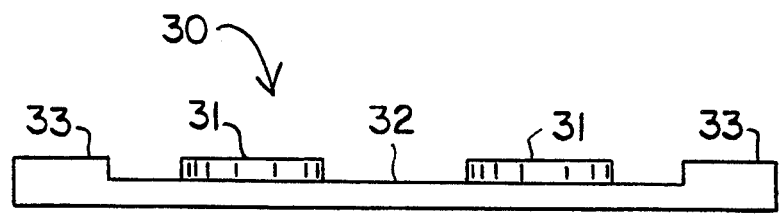
FIG. 8 is an end view of the belt joining apparatus.
Figure 9:
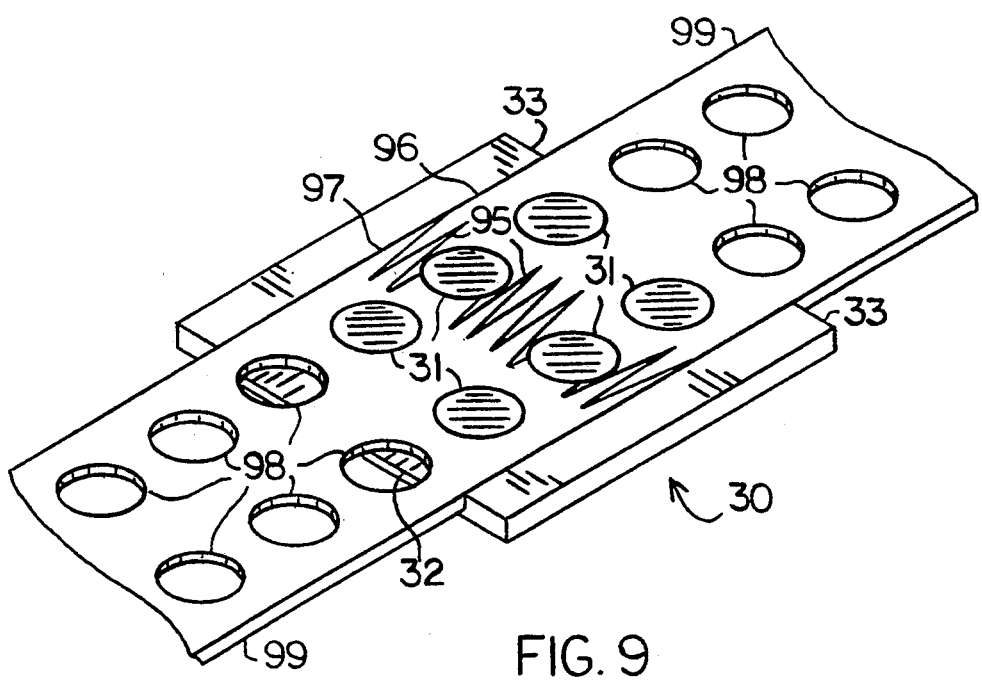
FIG. 9 is a perspective view of the belt joining apparatus with a belt in position.

The belt 99 is typically a multilayer belt having one or more thermoplastic layers. For example, belts of polyurethane and polyester components are well known in the industry. To join the free ends 97 and 96 at the splice cut 95, heat and pressure are used to melt together the thermoplastic layer or layers. It is important to maintain correct registration between the ends 97 and 96 during this operation, as well as to maintain correct dimensions on the apertures 98 connected by the splice cut 95. To accomplish this a belt joining apparatus 30 is provided, as shown in FIGS. 8 and 9, the belt joining apparatus 30 comprising at least six dimensioning plugs 31 extending from a planar press plate 32 and bounded on either side by form edges 33. The belt joining apparatus 30 is sized to fit within standard heat presses, not shown, which typically utilize air pressure or the like to create pressure on the pieces being joined.

The dimensioning plugs 31 are sized and positioned to correspond exactly to the apertures 98 in the belt 99. As with the indexing posts 13 of the aperture punching apparatus 10 and the registration posts 21 of the splice cutting apparatus 20, the center to center distances correspond both longitudinally and latitudinally to insure minimal deviation in the completed belt 99 after the ends 97 and 96 are joined. Form edges 33 are fixed and are separated by the exact width of belt 99. The form edges 33 are equal or greater in height to the height of belt 99. Preferably, the height of the dimensioning plugs 31 is less than the thickness of belt 99 by approximately eight thousandths of an inch, so that equal pressure is applied around the apertures 98 and across the entire surface of the belt 99.

The ends 97 and 96 of belt 99 are positioned onto the belt joining apparatus 30 as shown in FIG. 9. The splice cut 95 and the central apertures 98 are properly positioned by the central dimensioning plugs 31. During the melt flow operation, the central dimensioning plugs 31 maintain the proper dimensions for the apertures 98 in the splice. After applying the proper amount of heat and pressure the splice cut 95 becomes fused together, resulting in an endless loop transfer belt 99 with no loss of registration and no deviation from the minimal required tolerances.

In the known processes for creating endless looped transfer belts, tolerances of five thousandths of an inch in center-to-center distances and loss of registration of up to ¾ inches over a twenty foot belt are considered to be the best achievable. Under the process of the invention, deviations of less than two thousandths of an inch in center to center distances and loss of registration of less than ¼ inches over a twenty foot belt is achieved.

The above disclosure describes and illustrates the invention in terms of a belt 99 having apertures 98 in slightly offset pairs when taken laterally. This is a common configuration for transfer belts 99. It is to be understood that the invention is equally applicable to any number of longitudinal rows of apertures 98 and to any relative placement of the apertures 98 in a repetitive pattern on the belt 99. That is, the apertures 98 can be aligned in a single longitudinal row, in pairs either matching or offset, in triplets, etc. The repetitive pattern and dimensions of the apertures 98 of any belt 99 are simply matched by the pattern and dimensions of the indexing posts 13, the registration posts 21 and the dimensioning plugs 31.

It is further understood that obvious equivalents and substitutions to the steps and components described above may be apparent to those skilled in the art. The full scope and definition of the invention therefore is to be as set forth in the following claims.

I claim:

1. A process for the manufacture of an endless looped transfer belt having at least one layer of thermoplastic material and having a repetitive pattern of apertures, comprising the steps of:

(A) providing an aperture punching apparatus, a splice cutting apparatus and a belt joining apparatus;

said aperture punching apparatus comprising a number of cutting blades positioned in a repetitive center to center pattern to create a number of apertures in a belt, and a number of indexing posts which are dimensioned equal to and positioned in the same repetitive center to center pattern relative to said cutting blades, whereby the relative center to center distances and longitudinal and lateral spacing between said indexing posts match said relative center to center distances and longitudinal and lateral spacing of said cutting blades;

said splice cutting apparatus comprising a number of registration posts fixedly mounted to either side of a cutting surface, whereby said registration posts are dimensioned equal to and positioned in the same pattern relative to said apertures, whereby the relative center to center distances and longitudinal and lateral spacing between said registration posts match said relative center to center distances and longitudinal and lateral spacing of said apertures;

said belt joining apparatus comprising a number of dimensioning plugs, whereby said dimensioning plugs are dimensioned equal to and positioned in the same pattern relative to said apertures, whereby the relative center to center distances and longitudinal and lateral spacing between said dimensioning plugs match said relative center to center distances and longitudinal and lateral spacing of said apertures;

(B) placing said belt in said aperture punching apparatus and creating a first set of apertures;

(C) advancing said belt such that a number of said apertures are mounted onto said indexing posts of said aperture punching apparatus;

(D) creating a second set of apertures, and repeating said steps of advancing said belt, mounting said belt on said indexing posts and creating additional sets of apertures;

(E) cutting said belt to create a first end and a second end, positioning said first end of said belt on said splice cutting apparatus by mounting a number of said apertures on said registration posts;

(F) positioning said second end of said belt on said splice cutting apparatus so as to overlap said first end in the opposite direction by mounting a number of said apertures on said registration posts;

(G) cutting a splice joint through both said first end and said second end of said belt;

(H) positioning said first end of said belt onto one side of said belt joining apparatus by mounting a number of apertures on some of said dimensioning plugs;

(I) positioning said second end of said belt onto said belt joining apparatus from the opposite side by mounting a number of apertures on the remaining said dimensioning plugs, such that the splice joint cut into said first end mates with the splice joint cut into said second end;

(J) joining said first end to said second end by melting said thermoplastic layer by heat and pressure to create an endless belt.

2. The method of claim 1, where said apertures form a single longitudinal row.

3. The method of claim 1, where said apertures form a plural number of longitudinal rows.

4. The method of claim 1, where said registration posts on said splice cutting apparatus are at least twice as thick as said belt.

5. The method of claim 1, where said splice joint is in the form of a zig-zag pattern.

6. The method of claim 5, where said splice cutting apparatus further comprises a pair of cutting plates to cut said splice joint.

7. An endless apertured transfer belt composed of at least one layer of thermoplastic material made by the process of:

(A) providing an aperture punching apparatus, a splice cutting apparatus and a belt joining apparatus;

said aperture punching apparatus comprising a number of cutting blades positioned in a repetitive center to center pattern to create a number of apertures in a belt, and a number of indexing posts which are dimensioned equal to and positioned in the same repetitive center to center pattern relative to said cutting blades, whereby the relative center to center distances and longitudinal and lateral spacing between said indexing posts match said relative center to center distances and longitudinal and lateral spacing of said cutting blades;

said splice cutting apparatus comprising a number of registration posts fixedly mounted to either side of a cutting surface, whereby said registration posts are dimensioned equal to and positioned in the same pattern relative to said apertures, whereby the relative center to center distances and longitudinal and lateral spacing between said registration posts match said relative center to center distances and longitudinal and lateral spacing of said apertures;

said belt joining apparatus comprising a number of dimensioning plugs, whereby said dimensioning plugs are dimensioned equal to and positioned in the same pattern relative to said apertures, whereby the relative center to center distances and longitudinal and lateral spacing between said dimensioning plugs match said relative center to center distances and longitudinal and lateral spacing of said apertures;

(B) placing said belt in said aperture punching apparatus and creating a first set of apertures;

(C) advancing said belt such that a number of said apertures are mounted onto said indexing posts of said aperture punching apparatus;

(D) creating a second set of apertures, and repeating said steps of advancing said belt, mounting said belt on said indexing posts and creating additional sets of apertures;

(E) cutting said belt to create a first end and a second end, and positioning said first end of said belt on said splice cutting apparatus by mounting a number of said apertures on said registration posts;

(F) positioning said second end of said belt on said splice cutting apparatus so as to overlap said first end in the opposite direction by mounting a number of said apertures on said registration posts;

(G) cutting a splice joint through both said first end and said second end of said belt;

(H) positioning said first end of said belt onto one side of said belt joining apparatus by mounting a number of apertures on some of said dimensioning plugs;

(I) positioning said second end of said belt onto said belt joining apparatus from the opposite side by mounting a number of apertures on the remaining said dimensioning plugs, such that the splice joint cut into said first end mates with the splice joint cut into said second end;

(J) joining said first end to said second end by melting said thermoplastic layer by heat and pressure to create an endless belt.

8. The belt of claim 7, where said apertures form a single longitudinal row.

9. The belt of claim 7, where said apertures form a plural number of longitudinal rows.

* * * * *